United States Patent Office 2,784,200
Patented Mar. 5, 1957

2,784,200

4,4-DI-SUBSTITUTED 2-PYRROLIDONES AND PROCESS FOR THE MANUFACTURE THEREOF

Heinrich Frick and August-Hans Lutz, Basel, Switzerland, assignors to Hoffmann-La Roche Inc., Nutley, N. J., a corporation of New Jersey No Drawing. Application August 5, 1954, Serial No. 448,153

Claims priority, application Switzerland August 14, 1953

5 Claims. (Cl. 260—326.5)

It has been found that 4:4-di-substituted 2-pyrrolidones represented by the general formula

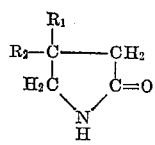

in which $R_1$ and $R_2$ each represent an alkyl, aryl, cycloalkyl or cycloalkenyl radical, are characterised by anticonvulsive properties. Some members of this group of compounds possess moreover a hypnotic activity.

According to the present invention the 4:4-di-substituted 2-pyrrolidones can easily be prepared by reduction of $\beta:\beta$-di-substituted $\beta$-cyano-propionic esters. Catalytically activated hydrogen can be used as reducing agent. Thus, when hydrogen is used under pressure in the presence of Raney nickel or Raney cobalt, it is possible to obtain, e. g., 4-phenyl-4-ethyl-pyrrolidone from ethyl-2-$\beta$-cyano-$\beta$-phenyl-$\beta$-ethyl-propionate and 4:4-diphenyl-2-pyrrolidone from ethyl $\beta$-cyano-$\beta:\beta$-diphenyl-propionate. If Raney nickel is used as catalyst, the double bonds of the cycloalkenyl groups are saturated. In the manner described above it is also possible to prepare 4-phenyl-4-isopropyl-2-pyrrolidone, 4-phenyl-4-cyclohexyl-2-pyrrolidone, 4-cyclohexenyl-4-methyl-2-pyrrolidone and 4-cyclo-hexyl-4-methyl-2-pyrrolidone.

The $\beta$-cyano-$\beta:\beta$-di-substituted propionic esters used as starting compounds may be obtained by reaction of the correspondingly substituted acetonitriles with haloacetic acid esters in an inert solvent in the presence of alkaline condensing agents.

The 4:4-di-substituted 2-pyrrolidones obtained according to the present invention are colorless substances which are difficultly soluble in water, but easily soluble in the common organic solvents. These compounds are to be used as anticonvulsive and hypnotics.

The present invention is further illustrated, but not limited by the following examples.

Example 1

To a solution of 10 parts by weight of ethyl $\beta:\beta$-diphenyl-$\beta$-cyano-propionate (M. P. 102 to 103° C.; prepared by condensing diphenyl-acetonitrile with ethyl bromoacetate in the presence of tert. potassium butylate in xylene) in 50 parts by volume of methanol 1 part by weight of Raney nickel is added and the mixture is shaken with hydrogen in an autoclave at a gauge pressure of 711.15 pounds per square inch. After absorption of 2 moles of hydrogen the catalyst is removed by filtration and the filtrate is concentrated. On cooling 4:4-diphenyl-2-pyrrolidone precipitates in the form of colorless crystals melting at 160 to 160.5° C.

Example 2

To a solution of 10 parts by weight of ethyl $\beta$-phenyl-$\beta$-ethyl-$\beta$-cyano-propionate (B. P. 105 to 110° C./0.05 mm.; prepared by condensing phenylethyl-acetonitrile and ethyl bromoacetate in the presence of sodium amide in benzene) in 50 parts by volume of methanol 1.5 parts by weight of Raney nickel are added and the mixture is shaken with hydrogen at a gauge pressure of 711.15 pounds per square inch at 100° C.

After absorption of 2 moles of hydrogen the catalyst is removed by filtration and the filtrate is concentrated. The residue is fractionally distilled in vacuo. The 4-phenyl-4-ethyl-2-pyrrolidone distils at 145 to 150° C. at a pressure of 0.04 mm. and solidifies in the receiver. After recrystallization from petroleum ether this compound melts at 64° C.

Example 3

To a solution of 10 parts by weight of ethyl $\beta$-phenyl-$\beta$-methyl-$\beta$-cyano-propionate (B. P. 110 to 114° C./0.08 mm.; prepared by condensing phenylmethyl-acetonitrile and ethyl bromoacetate in the presence of sodium amide in benzene) in 80 parts by volume of methanol 1.5 parts by weight of Raney nickel are added and the mixture is shaken with hydrogen at a gauge pressure of 1137.8 pounds per square inch at 120° C. When 2 moles of hydrogen are absorbed the catalyst is removed by filtration and the filtrate is concentrated at reduced pressure. The 4-phenyl-4-methyl-2-pyrrolidone crystallizes out in the form of a colorless solid and in a good yield. After recrystallization from methanol the crystals melt at 126 to 127° C.

Example 4

In an autoclave provided with a stirrer 10 parts by weight of ethyl $\beta$-phenyl-$\beta$-n-propyl-$\beta$-cyano-propionate (B. P. 173° C./11 mm.; prepared by condensing phenyl-n-propyl-acetonitrile and ethyl bromoacetate in the presence of sodium amide in absolute ether) are dissolved in about 80 parts by volume of methanol and to the solution 1.5 parts by weight of cobalt catalyst (e. g. Raney cobalt) are added. The mixture is subjected to hydrogenation at a gauge pressure of 1137.8 pounds per square inch at 120° C. When 2 moles of hydrogen are absorbed the catalyst is removed and the obtained solution is concentrated. 4-phenyl-4-n-propyl-2-pyrrolidone remains in the form an oil which soon solidifies. After recrystallization from ether the crystals melt at 86 to 87° C.; B. P. 200° C./0.05 mm.

In a similar manner the following compounds can be prepared: 4-phenyl-4-isopropyl-2-pyrrolidone, M. P. 109° C.; 4-phenyl-4-cyclohexyl-2-pyrrolidone, M. P. 176 to 177° C.; 4-cyclohexenyl-4-methyl-2-pyrrolidone, M. P. 96.5° C.; 4-cyclohexyl-4-methyl-2-pyrrolidone, M. P. 105 to 106.5° C.

What we claim is:
1. 4-phenyl-4-lower alkyl-2-pyrrolidone.
2. 4-phenyl-4-ethyl-2-pyrrolidone.
3. 4-phenyl-4-methyl-2-pyrrolidone.
4. 4-phenyl-4-n-propyl-2-pyrrolidone.
5. 4-phenyl-4-isopropyl-2-pyrrolidone.

References Cited in the file of this patent

UNITED STATES PATENTS

| | | |
|---|---|---|
| 2,351,939 | Drossbach et al. | June 20, 1944 |
| 2,405,555 | Bergel et al. | Aug. 13, 1946 |
| 2,681,349 | Dunlop et al. | June 15, 1954 |

FOREIGN PATENTS

| | | |
|---|---|---|
| 596,539 | Great Britain | Jan. 6, 1948 |

OTHER REFERENCES

Beilstein: 4th Ed., 2nd Supp., Band XXI, pp. 216, 217, 256.
Jour. Am. Chem. Soc., vol. 58, p. 2487 (1936).
Jour. Am. Chem. Soc., vol. 66, pp. 1883–4 (1944).
Jour. Am. Chem. Soc., vol. 75, pp. 2986–88 (1953).